Figure 1:
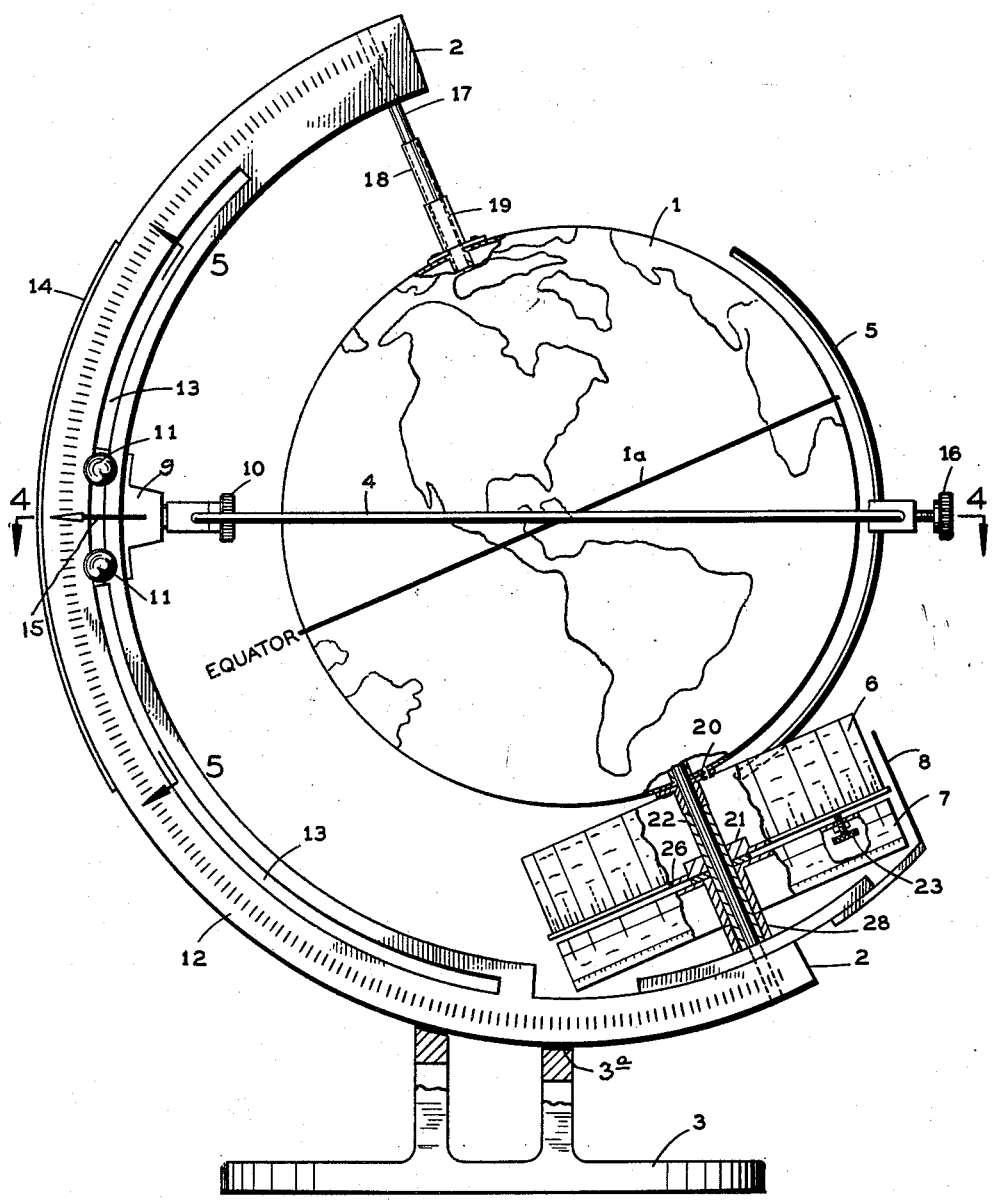

July 20, 1965  F. W. SUNDBLAD  3,195,243
EDUCATIONAL DEVICE FOR TEACHING EARTH-SUN FACTS AND FOR
DEMONSTRATING AND DUPLICATING PLANETARY
AND MAN-MADE MOVEMENTS
Filed Jan. 2, 1963  5 Sheets-Sheet 1

INVENTOR.
FOLKE W. SUNDBLAD
BY
ATTORNEY

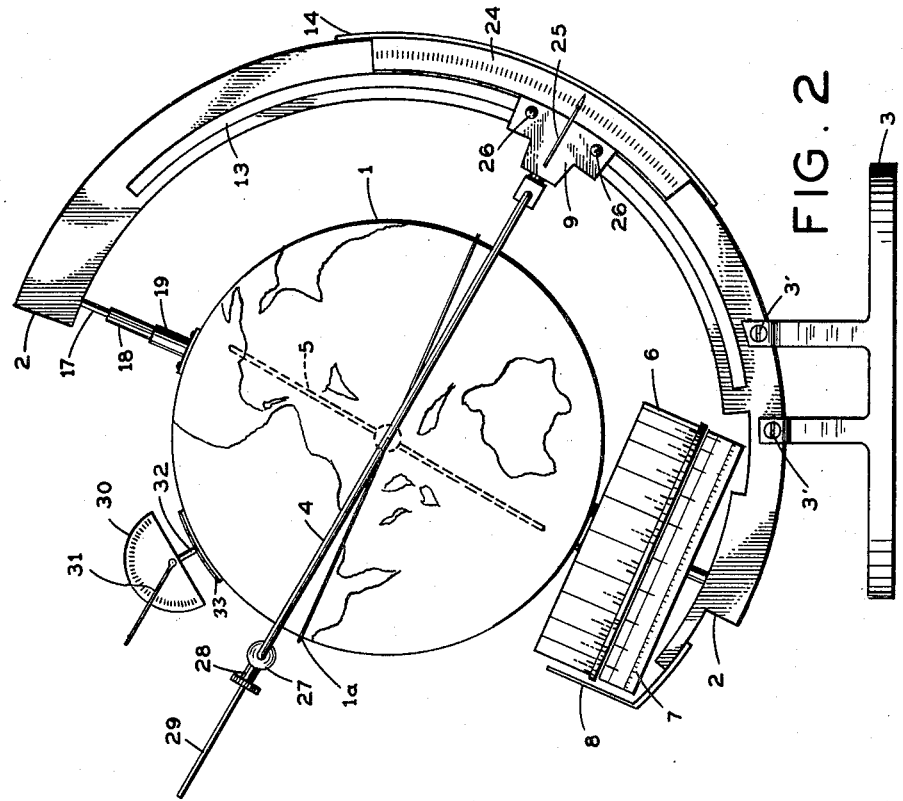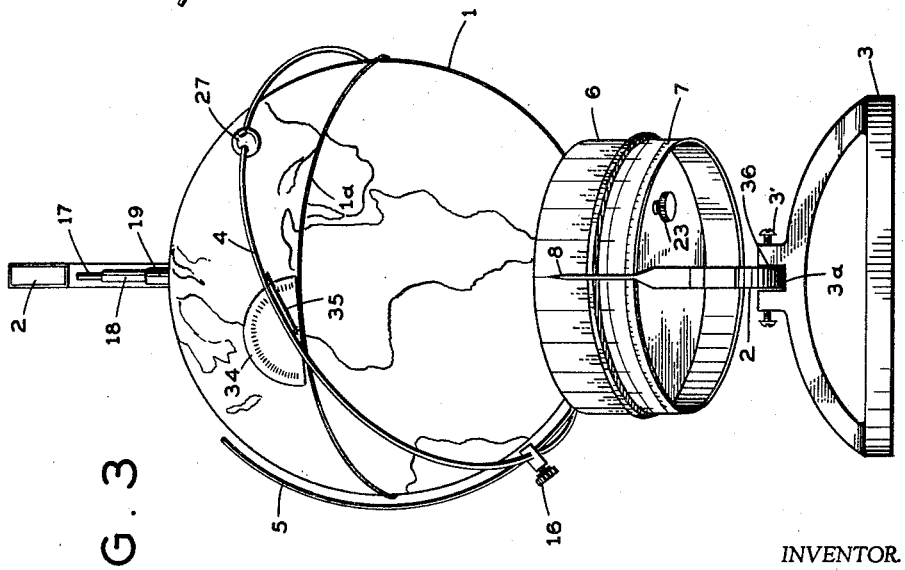

July 20, 1965 F. W. SUNDBLAD 3,195,243
EDUCATIONAL DEVICE FOR TEACHING EARTH-SUN FACTS AND FOR
DEMONSTRATING AND DUPLICATING PLANETARY
AND MAN-MADE MOVEMENTS
Filed Jan. 2, 1963 5 Sheets-Sheet 3

INVENTOR.
FOLKE W. SUNDBLAD
BY
ATTORNEY

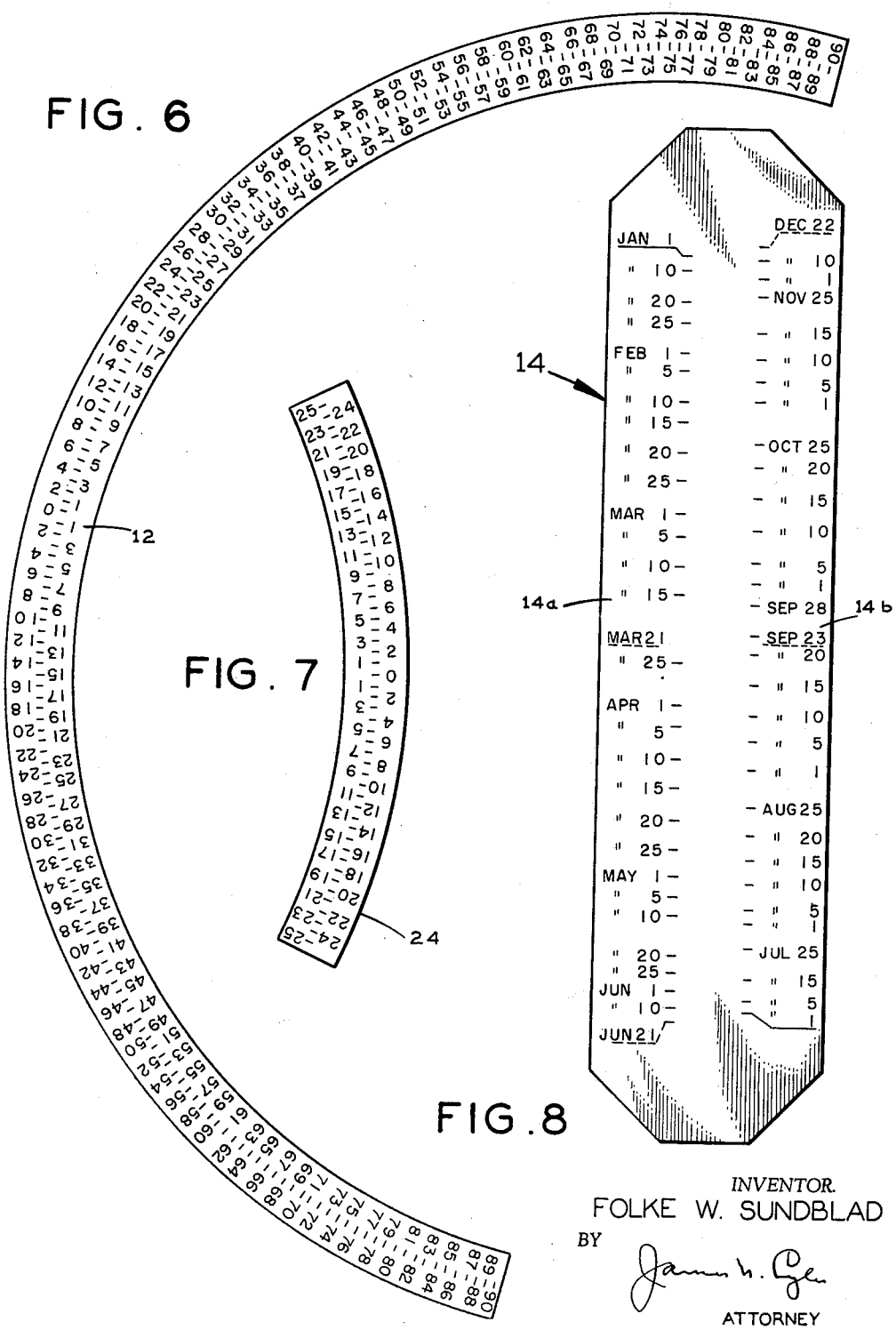

Figures 9, 10:
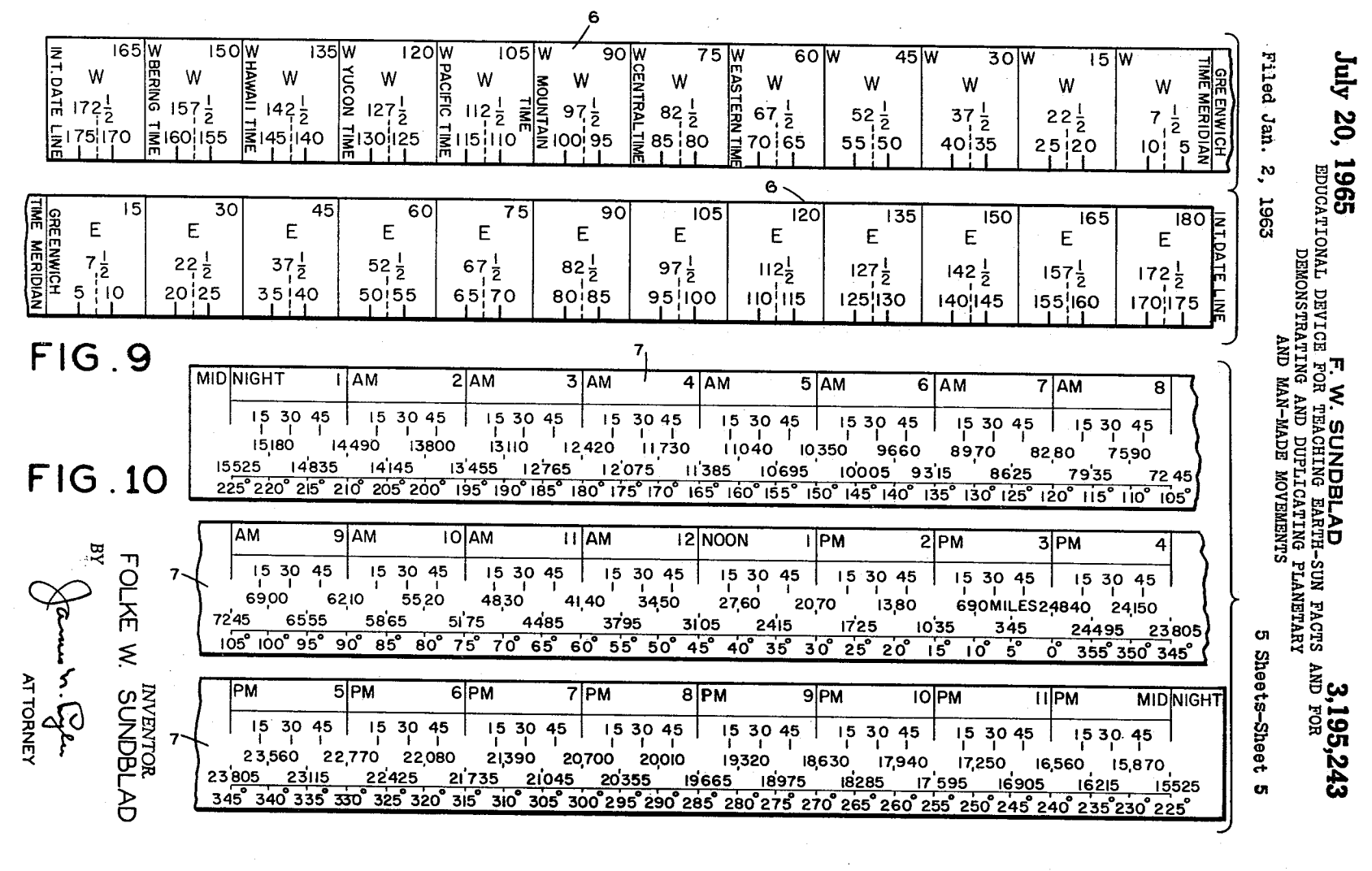

July 20, 1965

F. W. SUNDBLAD 3,195,243

EDUCATIONAL DEVICE FOR TEACHING EARTH-SUN FACTS AND FOR
DEMONSTRATING AND DUPLICATING PLANETARY
AND MAN-MADE MOVEMENTS

Filed Jan. 2, 1963

INVENTOR
FOLKE W. SUNDBLAD
BY
*[signature]*
ATTORNEY

UNITED STATES PATENT OFFICE 3,195,243
Patented July 20, 1965

3,195,243
EDUCATIONAL DEVICE FOR TEACHING EARTH-SUN FACTS AND FOR DEMONSTRATING AND DUPLICATING PLANETARY AND MAN-MADE MOVEMENTS
Folke W. Sundblad, 3529 SW. 12th Place, Fort Lauderdale, Fla.
Filed Jan. 2, 1963, Ser. No. 249,054
3 Claims. (Cl. 35—46)

This invention relates to an instrument for teaching earth-sun facts and relationships by being capable of demonstrating and duplicating planetary and man-made movements involved. Specifically, the major objects of this invention are:

(1) To demonstrate the apparent latitudinal movements of the sun, viz. the so called declination movements, in so simplified a manner that astronomic events as, for instance, equinoxes and solstices, as well as the causes to our changing seasons are automatically explained.

(2) To demonstrate the orbital movement of a man-made satellite in a manner bringing out the close relationship between this movement and the revolution of the earth around the sun.

(3) To demonstrate a combination of planetary movements by duplicating the exact apparent latitudinal movements of the sun in conjunction with the rotation of the globe with the object of illustrating a simple procedure of determining the time of sunrise and sunset for any given locality on any given date. This demonstration will also illustrate the ever changing position of the circle of illumination and the effects thereof upon the duration of daylight and darkness at different latitudes, as well as the difference between sun time and standard time.

(4) To demonstrate the rotation of the earth on its axis in a manner greatly simplifying problems dealing with time differentials produced when crossing the international date line and midnight meridian. Likewise, the solution to problems of measuring the distance of great circle routes is made equally self-explanatory.

(5) To demonstrate procedures of measuring and determining angles of the sunbeam pertaining to altitude, latitude, declination, etc., for the purpose of explaining basic principles of navigation by the sun.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 4:
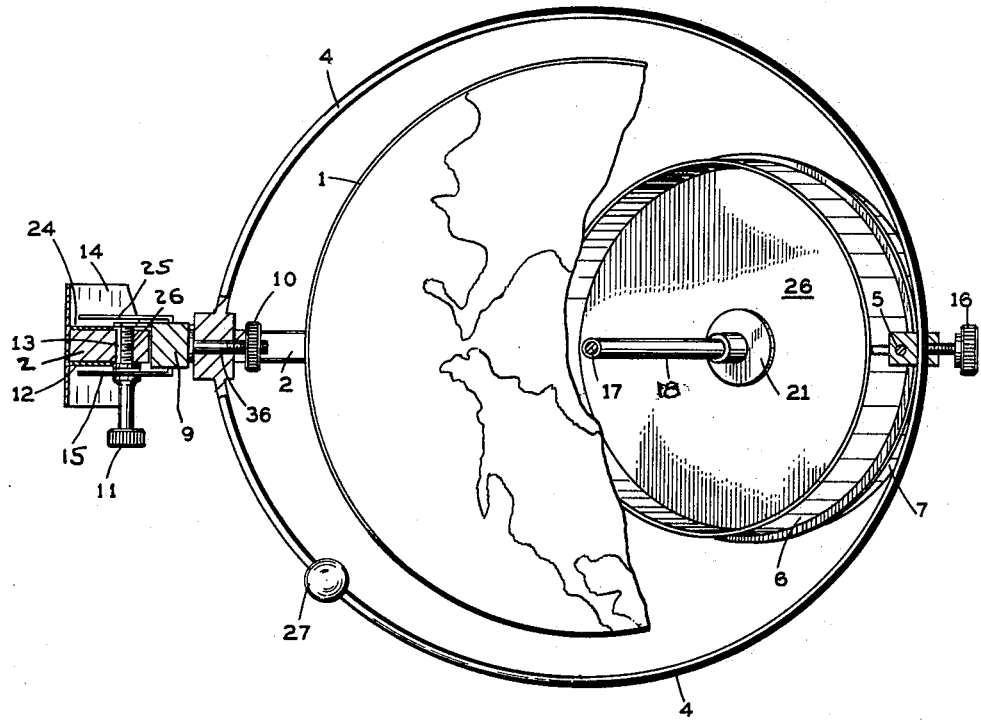
Figure 5:
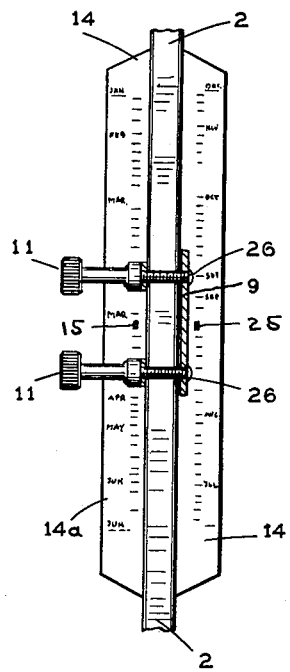

In the drawings:

FIGURE 1 is a left side elevational view of a device constructed in accordance with the invention, FIGURE 2 is a side elevation taken from the opposite side of FIGURE 1, FIGURE 3 is a front elevational view of the device, FIGURE 4 is a horizontal section taken substantially on line 4—4 of FIGURE 1, FIGURE 5 is a fragmentary sectional view taken substantially on line 5—5 of FIGURE 1, FIGURE 6 is an enlarged side elevational view of a scale indicated on FIGURE 1, FIGURE 7 is an enlarged view of a scale shown on FIGURE 2, FIGURE 8 is an enlarged view of a chart 14 supported by a frame member and as indicated generally on FIGURES 1, 2 and 4, FIGURE 9 is an enlarged view of a rotary chart shown in FIGURES 1, 2 and 3, and FIGURE 10 is an enlarged view of a rotary chart that is operative in connection with the chart of FIGURE 9.

To achieve these objects, this invention relates to certain structural features and details, which hereinafter will be fully described and embodied in the claims.

FIGURE 1 shows a view of the left-hand side of the instrument illustrating the relative positions of the major parts consisting of globe 1; frame 2; base 3; partly circular and partly elliptically shaped ring 4; partly circular arm 5; scale attached to the rim of circular, cup shaped part 6 (hereinafter referred to as chart 6); scale attached to the rim of circular cup shaped part 7 (hereinafter referred to as chart 7); pointer 8 attached to frame 2; housing 9 supporting ring 4; locking device 10 anchoring the swivel movements of ring 4; locking devices 11 anchoring movements of housing 9 along frame 2; slot 13 in frame 2; arcuated scale 14 attached to backside of frame 2; pointer 15 attached to housing 9; locking bolt 16 for arm 5; axis 17 of the globe and charts 6 and 7; tubing 18; fastener 19 anchoring globe to tubing 18; fastener 20 anchoring globe to tubing 18; fastener 21 anchoring chart 6 to tubing 18; tubing 22 with right angle flange attached to the closed end of chart 7; locking bolt 23 anchoring chart 7 to chart 6.

FIGURE 2 shows a view of the right-hand side of the instrument illustrating the position of scale 24 relative to scale 14 attached to the backside of frame 2; housing 9; pointer 25; bolts 26 protruding through slot 13 and connected with locking devices 11 on the opposite side of the frame; the angular position of partly circular and partly elliptically shaped ring 4 relative to the equator of the globe when the plane of ring 4 is perpendicular to the plane of frame 2; ball 27; locking bolt 28; short rod 29 temporarily attached to bolt 28 to indicate the direction of sun beam; protractor 30 temporarily placed on globe in line with axis 17 and short rod 29; arm 31; supporting rod 32; curved base 33; the right angle position of arm 5 relative to ring 4.

FIGURE 3 is a face view of the instrument showing the angular position of ring 4 relative to the equator when the plane of ring 4 is not perpendicular to the plane of frame 2; curved protractor 34 temporarily placed at the intersection of ring 4 and the equator to register the angle between the planes thereof with arm 35.

FIGURE 4 shows a sectional view along line 4—4 of FIGURE 1 of the instrument illustrating the position of partly circular and partly elliptically shaped ring 4 relative to globe 1; housing 9; pivot 36; locking device 11; bolts 26; frame 2; scale 14; ball 27; axis 17; charts 6 and 7; partly circular arm 5; locking bolt 16.

Base 3, shown particularly in FIGURE 3 is slotted at 3a for the sliding reception of the frame 2 and whereby the frame may be adjusted with respect to the base so as to attain the essential angle of 23½° for the globe 1. Clamping screws 3' are engaged with the frame 3 to lock the frame 2 in a definitely fixed angular position since the base 3 is normally disposed upon a flat level surface.

Referring to these drawings, this invention embodies as essential features, a model of the earth 1 (hereinafter referred to as the globe), which is rotative on axis 17, being permanently set at 23½° angle with a line vertical to the horizontal line marked in FIGURE 1. This globe should preferably be made of metal. Frame 2 is provided with a slot 13, which serves as a guide for the movement of housing 9 and can be extended almost the entire length of the frame. The frame is made wide enough to permit the housing to move freely without touching scale 12 and 24 attached to each side of the frame.

Base 3, made of either wood or cast or stamped out metal, is provided with slots in which frame 2 is inserted and locked in a position whereby the plane of the frame is vertical to the horizontal line in FIGURE 1. The frame can be locked either by bolt through the frame and the bottom of the slot or by bolts through the sides of the slot, to prevent the frame from extending too far over the base and thereby create an unbalanced appearance relative to the vertical center line of the instrument, the bottom of the slot is made slanting downward toward the front of the base.

Ring 4 is partly circular and partly elliptical, is mounted on pivot bolt 36, in FIGURE 4. This pivot, in turn, is mounted on housing 9, which is movable along frame 2. By this arrangement the plane of ring 4 can be set in almost any angle with that of the equator. The rotation movement on the pivot bolt is locked by locking device 10, and the up-and-down or latitudinal movement along the frame is locked by locking devices 11. Semi-circular arm 5 is mounted in 90° angle with ring 4 and is movable along same, and is locked by bolt 16. The ball 27, FIGURE 2, is also mounted on and movable along ring 4. Circular chart 6 is mounted on and rotates on the same tubing 18 as that of the globe. The movement of this chart follows that of the globe and is so synchronized with same that the longitudinal lines at the equator correspond with and are identical as to number with the parallel lines drawn on the chart. The full parallel lines (FIGURE 9) represent the prime (middle) meridians of each of the 24 time zones. The dotted lines represent the division meridians of these time zones, while the short lines represent meridians at every fifth longitudinal degree.

Circular chart 7 is also rotative on tubing 18 but has an independent movement of that of the globe and chart 6. It records hours and fractions thereof, as well as mileage and longitudinal degrees (FIGURE 10). A pointer 8 attached to frame 2 registers the movements of charts 6 and 7 in conjunction with that of the globe. Lock bolt 23 in FIGURE 1 and FIGURE 3 is situated underneath chart 7 and serves the purpose of locking chart 7 to chart 6.

Curved scale 12 attached to the left-hand side of frame 2 denote latitudinal degrees. A curved scale 24 also denoting latitudinal degrees is attached to the opposite side of the frame. Chart 14 (FIGURE 1 and FIGURE 5), denoting the so-called declination movement of the sun is mounted on the backside of frame 2 in such a manner that said movement from January 1st to June 21st (FIGURE 8) is visible on the left-hand side of the frame, indicated at 14a, and the movement from July 1st to December 22nd is visible on the right-hand side of the frame, indicated at 14b. The dates of March 21st and September 23rd indicating spring and autumnal equinoxes appear opposite the zero points on scales 12 and 24. Two pointers 15 and 25 attached to each side of housing 9 register degrees on scales 12 and 24, as well as dates and months on chart 14.

Short rod 29 (FIGURE 2) indicating the direction of the sunbeam is temporarily mounted on ball 27 and is locked by bolt 28 in position where it is in line with the plane of ring 4.

Protractor 30 (FIGURE 2) equipped with movable arm 31 and supporting rod 32 and curved base 33 is temporarily used when determining and measuring the altitude of the sun for a given locality on a given date.

Curved protractor 34 in FIGURE 3 equipped with movable arm 35 is temporarily used in setting the orbit of man-made satellite in true angle with the plane of the equator.

The functions of these various components become more clarified when described in connection with the operation of this instrument and procedures involved to achieve the before mentioned five objects.

*In regard to No. 1 object*, FIGURE 2 shows ring 4 set in a position where its plane is perpendicular to that of the frame 2. The short rod 29 indicating the direction of the sun-beam has been moved and anchored in a position where it is in direct line with pointer 8 and the upper part of frame 2, as well as with the plane of ring 4.

Assuming that the date would be September 23rd, the pointer 25 attached to housing 9 would point at the zero mark on scale 24, while the short rod 29 would be in line with the equatorial line on the globe. This would indicate that the sun would be vertical over the equator, or on this date it would pass from the Northern to the Southern Hemisphere, and thus be dividing this date in equal length of day and night. This event is referred to as the autumnal equinox, because it marks the beginning of autumn in the Northern Hemisphere.

When ring 4 and housing 9 have been moved to a point on scale 14 where pointer 25 points at the mark opposite the 23½° line on scale 24, the date is December 22nd. In this position, the short rod 29 will point directly at the 23½° latitude south of the equator indicating that the sun is vertical over this parallel on this date. This latitude is called the Tropic of Capricorn and marks the end of the apparent south bound movement of the sun and the beginning of its north bound movement. Because the sun at this turning point seems to be standing still for a few days, this event is referred to as the winter solstice. When ring 4 and housing 9 is moved backward and reaches the zero point of the scale 12 on the opposite side of frame 2, the pointer 15, FIGURE 1, will point at the March 21st mark on scale 14. In this position, the short rod 29 will again be in line with the equatorial line on the globe indicating that the sun is vertical over the equator on this date. It will also indicate the apparent passing of the sun from the Southern to the Northern Hemisphere marking the end of the winter season in the Northern Hemisphere and the beginning of spring north of the equator. This event is referred to as the vernal equinox or spring equinox.

When ring 4 and housing 9 are moved farther back and reaches the line marked June 21st on scale 14, the short rod 29 will point directly at the 23½° latitude north of the equator indicating that the sun is vertical over this latitude. This latitude is called the Tropic of Cancer and marks the end of the apparent north bound movement of the sun and the beginning of its south bound movement. This event is referred to as the summer solstice. When this south bound movement again passes the equator, the apparent annual back-and-forth movement of the sun is completed. The educational value of this demonstration is further enhanced by the fact that it enables the student to plot this entire annual movement and thereby produce a most interesting profile of the revolution of the earth around the sun, which is ideally suited to pin-point additional astronomic aspects as, for example, the so called signs of zodiac.

*In regard to No. 2 object.*—FIGURE 3 shows the ring 4 representing the orbit of a man-made satellite in an angular position relative to the plane of the equator. The procedure to set this angle and to determine the geographic position of the satellite at a given time is as follows: Assuming that the satellite would be launched from Cape Canaveral situated approximately on the 27° north latitude and the 81st longitude west, and that the angle between the plane of the orbit and that of the equator would be 30 degrees, the first step would be to rotate the globe until this locality is in direct line with the pointer 8 and the upper part of axis 17. Second, to move ring 4 and housing 9 along the frame 2 until pointer 25 attached to housing points at the 27° latitude on scale 24, and then lock the housing with locking device 11. Third, to turn ring 4 on pivot bolt 36 (FIGURE 4) until arm 35 on protractor 34, which is placed at the intersection of the ring and the equator, registers 30°, whereupon the ring is anchored in this position with locking device 10 (FIGURE 4).

Also assuming that the satellite would be launched at 8 a.m. Eastern Stand. Time, and that the time for making one revolution around the earth would be 90 minutes, the fourth step would be to rotate circular chart 7 until the 8 a.m. line would be opposite a point corresponding to the 81st longitude west on chart 6, whereupon chart 7 is locked to chart 6 with locking bolt 23.

On the basis of these assumptions and the premise that the satellite represented by ball 27 would be moving in the same direction as the rotation of the earth, that is from west to east or clockwise facing north, the operation of the instrument to determine the geographic position of the satellite after one orbit would simply be to rotate the globe to a point where the pointer 8 would cover the 6:30 a.m. mark on chart 7, at which mark the pointer would also register on chart 6 that the satellite would be in the Mountain Standard Time zone or, more specifically, above the 102½° longitude west. The latitudinal position would be determined by the ball itself relative to the map underneath.

By this arrangement the orbital movements of a satellite relative to the rotation of the globe can be easily followed regardless of the number of orbits involved. This possibility becomes particularly thought provoking in the case of the Russian satellites launched from a position about 250 miles southeast of Moscow and in 65 degrees angle with the equator, because the sequence of the exact number of orbits covering U.S.A. can thus be determined.

From educational standpoint, this partly circular and partly elliptical orbit can well serve as a teaching aid in demonstrating when the satellite is in apogee and perigee and corresponding positions called aphelion and perihelion of the earth's orbit around the run, or in explaining basic laws of planetary motion determining the speed of the satellite in an elliptical orbit, etc.

In regard to No. 3 object, FIGURE 2 illustrates an angular position of ring 4 with the equator, and also that the arm 5 representing part of the circle of illumination is locked in a position along ring 4 where it crosses the equator and thereby divides the globe into simulated illuminated and dark halves. To determine the time of sun-rise and sun-set for a given locality on a given date the problem in this case is solved in conjunction with the rotation of the globe and chart 7, which will show the exact time when the locality enters the illuminated half of our planet. Inasmuch as the number of hours and minutes between sun-rise and noon is equal to that between noon and sun-set, the exact time of the latter event is easily calculated. But this procedure produces standard time for these two events only on four days of the year, when sun time and clock time are the same. On all other dates, the former time is either slower or faster than the latter time, the amount of difference of which is designated the equation of time and is recorded on the analemma printed on the globe. Since this time differential constitutes the only variable factor involved in converting solar time into standard time in this particular case, the entire problem of determining the time for sunrise and sunset in terms of standard time for any given locality on any given date is greatly simplified. The procedure to do so for, say Miami on October 10th is as follows:

No. 1 step is to move ring 4 and housing 9 along frame 2 until pointer 25 points at the October 10th's mark on chart 14 and lock housing by device 11. Ring 4 is also locked by locking device 10 in a position where the plane of same is perpendicular to that of frame 2. Second step is to move arm 5 to a position where it crosses the equator and thereby divides the globe in two halves and to lock same by bolt 16. It should be here pointed out that the spacing of the chart 6 from the globe is such as to permit the arm 5 to traverse the ring 4 and its lower end enters the open end of the chart 6 to a point adjacent to the axis of the globe. Third step is to rotate globe until Miami situated on 80th longitude is underneath arm 5. Fourth step is to rotate chart 7 until the noon line is underneath pointer 8 and lock this chart to chart 6 by bolt 23 underneath chart 7. Fifth step is to rotate the globe until the 80th longitude line on chart 6 is in line with pointer 8. In this position pointer 8 will register sun-rise on October 10th for Miami in terms of solar time, which time according to the analemma printed on the globe pertaining to the time equation is about 13 minutes faster than standard time on this date. As a result, this number of minutes must be deducted in order to arrive at correct standard time in this case. From educational standpoint, this technique in demonstrating sun-rise not only reveals the ever changing position of the circle of illumination and the relationship between the duration of daylight at any latitude and the apparent declination of the sun, etc., but also serves as an appropriate approach to the study of related astronomic aspects of the sun-earth relationship pertaining to the time element as, for example, the variable factors in regard to the position and distance of a locality relative to the prime time zone meridian, which are of equal importance as that of equation of time in converting solar time into standard time in the case of a sun-dial.

In regard to object No. 4 this instrument lends itself very well to demonstrate simple procedures to determine time differentials existing between different longitudinal positions on the globe. Assuming that ring 4 in FIGURE 3 would be in line with the equator and that the partly circular arm 5 would be aligned with pointer 8 and axis 17 as indicated by the dotted lines, this arm in conjunction with charts 6 and 7 would convey the distance between different localities when rotating the globe, whether it is in terms of minutes and hours or degrees or mileage.

To determine time differentials involving only hours and longitudes, the globe can be rotated either clockwise or anti-clockwise to get the true answer. For example, to determine the time for a locality situated on, say, the 120 W. longitude, when the time on the 75 W. longitude is 10 a.m., the procedure is to rotate the globe until arm 5 covers the 75 W. longitude, and rotate chart 7 until the 10 a.m. mark is in line the 75 W. longitude line on chart 6 and the pointer 8 and lock chart 7 to chart 6 with bolt 23 underneath chart 7. Then rotate the globe either clockwise or anti-clockwise until arm 5 covers longitude 120 W. Pointer 8 will then register 7 a.m.

When the time differentials involve not only hours, but also days and dates and the crossing of the international date line and midnight meridian, the problem becomes far more intricate. Because of the importance of these two meridians they are made to appear more prominent than the other longitudes and markings on charts 6 and 7.

This instrument is capable of greatly simplifying these problems, because it employs the direction of the rotation of the globe as a means of dividing the problems into smaller easily comprehensible parts. This direction is determined by the following rules:

(1) The globe is rotated *clockwise*, when the place for which the hour, day and date are sought is WEST of the place for which these data are known.

(2) The globe is rotated *anti-clockwise*, when the place is EAST of the place for which data are known.

Applying these two rules to the crossing of the international date line Today Becomes Tomorrow by No. 1 rule, and Today Becomes Yesterday by No. 2 rule.

Applying these two rules to the crossing of the midnight meridian, Today Becomes Yesterday by No. 1 rule, and Today Becomes Tomorrow by No. 2 rule.

Applying these two rules to the crossing of both the international date line and the midnight meridian, the positive and negative changes pertaining to days and dates counteract each other with the result that the day and date remain unchanged. For example, to determine the hour, day and date in Los Angeles, situated on the 120th W. longitude, when in Shanghai, 120 E. longitude is 10:00 p.m. Sunday, August 2nd, the first step is to rotate the globe until arm 5 covers Shanghai. Second, to rotate chart 7 until the 10:00 p.m. mark is in line with 120 E. line on chart 6 and pointer 8, and lock chart 7 to chart 6. Third, to rotate the globe anti-clockwise (Los Angeles is east of Shanghai). By so doing, the midnight meridian is crossed at 150 E. longitude, and Sunday becomes Monday and the date Aug. 3rd, but at crossing the international date line at the 180th longitude, Monday becomes Sunday and the date Aug. 2nd. When Los Angeles is reached and covered by arm 5, the pointer 8 will record the time as 6 a.m., while the day and date will remain Sunday Aug. 2nd.

When demonstrating this subject matter, a card displaying these simple rules should be attached to the upper part of frame 2 immediately above the globe in plain view of the operator of this instrument.

The rotation of the globe in conjunction with charts 6 and 7 serves also the purpose of simplifying problems dealing with the measurements of great circle routes. This method is based on converting this distance into either mileage or degrees derived from known data pertaining to the equatorial circumference or that one longitudinal degree at the equator amounts to about 69 statute miles. The mileage printed on chart 7 applies to the equatorial circumference.

To determine, for example, the circle distance between Chicago and Rome, the procedure would simply be to place a strip of paper between these two places and mark the locations thereon. Then place the strip along the equator with the Rome mark in line with pointer 8 covering the zero mileage point on chart 7, whereupon the globe is rotated clockwise until Chicago is in line with pointer 8. It will then register on chart 7 that the distance between Chicago and Rome is about 4800 statute miles or 70 longitudinal degrees.

In regard to object No. 5, FIGURE 2 illustrates ring 4 placed in a position where its plane is in right angle with that of frame 2 and in angular position with that of the equator, which angle is registered by pointer 25 on scale 24 in terms of latitudinal degrees and on chart 14 in terms of dates and months. The short rod 29 indicating the direction of the sunbeam is in line with the plane of ring 4 and therefore its angle with the equator is identical to that of the ring. The protractor 30 is temporarily placed on the globe in direct line with short rod 29 and pointer 8, in which position the base of the scale on the protractor represents local horizontal line and supporting rod 32 the zenith line.

To determine the altitude of the sun at noon on, for example, May 10th for Chicago situated on the 41½° N. latitude, the procedure would be to place protractor on the geographic position thereof and move ring 4 and housing 9 along frame 2 until pointer 15 registers May 10th on chart 14. Then move arm 31 on the protractor until it is parallel with short rod 29 indicating the direction of the sun-beam on this particular date and month. The angle between the base of the scale and arm 31 will then denote this altitude or 66°. The angle between the zenith line and arm 31 equals 90 minus 66 or 24°, which angle is termed zenith distance. Inasmuch as the latitude of a given place equals zenith distance plus or minus the declination angle depending upon the positions of the sun and latitude relative to the equator, the latitude in this case would be zenith distance plus declination, because both the place and the sun are on the same side of the equator, or the latitude of Chicago would be 24 plus 17.5 (declination angle) or 41.5 degrees north. Should the date have been Feb. 1st, when the sun is vertical over 17° latitude south of the equator, this declination angle would have to be deducted from zenith distance, which in this case would be 61°, in order to produce the latitudinal degree of Chicago.

This invention incorporates certain principles and features pertaining to the design of the frame 2 and housing 9 to insure that the movements of ring 4 and its component parts register true alignments between latitudinal positions on the globe and latitudinal degrees on scales 12 and 24, as well as between longitudinal positions on the globe and corresponding lines on chart 6. This invention also incorporates certain principles and features pertaining to the designs of charts 6 and 7, as well as to the mounting of the globe and these charts on the axis 17 to insure precise alignments of the longitudinal points along the equator with the parallel lines on chart 6, and to facilitate the application of mass production techniques to the manufacturing of this instrument.

Frame 2 is provided with a slot 13 as shown in FIGURES 1, 2 and 4 to serve both as a guide for the movement of housing 9 and as a means by which the housing can be locked in a manner, which automatically places the pivot bolt 36 attached to the housing in true perpendicular and middle position relative to the frame. The housing 9 in FIGURE 4 is provided with two bolts attached to the side of the housing in line with the slot and protruding through the same to the other side of the frame. Locking devices 11 are screwed on the ends of these two bolts and when tightened bring the housing and the pivot bolt into true alignment with the middle line of the frame.

Charts 6 and 7, FIGURES 3 and 10, are designed with three major objectives in mind.

(1) To convert the points where the prime time zone meridians cross the equator into parallel lines on chart 6, and thereby take advantage of the fact that the distance between longitudinal lines is the greatest at the equator. As a result, the distance between the parallel lines on chart 6, FIGURE 9, permits division of the time zones into fractions thereof, even though the circumference of the scale is much smaller than that of the globe.

(2) To achieve maximum width of charts 6 and 7 to permit space enough for the various data pertaining to time zones, time, mileage and degrees printed on these scales. This problem has been solved by designing the charts in cup shaped form with the closed ends facing each other. This arrangement permits the bolt serving as locking device for the two charts to be placed underneath chart 7, and also that the globe can be situated partly inside the open end of chart 6 without interfering with the movements of ring 4 and arm 5, and thereby reduce the space occupied by the globe and the two charts to a minimum.

(3) To take advantage of the fact that the axis of the globe and charts 6 and 7 are permanently inclined 23½° away from the vertical line of 4—4 by printing the data involved on the rim of these two scales and thereby greatly facilitate the operation thereof and the reading of the data by the observer in front of the instrument.

To facilitate the manufacturing of this instrument the globe and the charts 6 and 7 are mounted on a tubing 18, FIGURE 1, the inside diameter of which is equal to that of the rod 17 supporting the entire assembly. Because this tubing is somewhat shorter than the inside diameter of the frame, the assembling of the globe and the two charts becomes a separate operation from that of the frame, base, housing, etc. Thus, the globe is first fastened to tubing 18, then chart 6, which is mounted on the shorter tubing 21, the inside diameter of which is equal to that of the outside diameter of tubing 18, is placed over and anchored to the longer tubing making certain that the longitudinal points along the equator correspond to the parallel lines on the chart 6; then chart 7, which is also mounted on a short tubing 22 the inside diameter of which is equal to that of the outside diameter of tubing 21, is placed over the latter tubing, but not fastened to same; the final step is to place these three assembled parts, which have been directly and indirectly mounted on the long tubing 18, in line with the holes in the frame and insert rod 17 through these holes and the tubing. The equator on the globe will then be in line with the zero points on scales 12 and 24.

Having described my invention what I claim as new and desire to secure by Letters Patent is:

1. An educational instrument of the character described for demonstrating earth-sun-Satellite facts and relationships comprising in combination a half-circular frame, a base for supporting the frame in a perpendicular position, a world globe rotatably supported by the frame, the axis of rotation of the globe being 23½° from the vertical, a housing slidable on the inside circumference of the frame, means for fixing the housing in adjusted position in direct relation with the equatorial plane of the globe, pivot means carried by the housing, a partly circular and partly elliptical ring encircling the globe and supported by the pivot means, a clamping nut for fixing the ring in various angular positions with respect to the pivot and the globe, a pair of cylindrical concentric co-axial charts mounted below the globe and with the charts being co-axial with respect to the axis of the globe and with the upper cup-shaped chart being rotatable with the globe and the lower cup-shaped chart being independently rotatable, means for locking the two charts together after adjustment, a pointer attached to the lower portion of the frame and extending over both of the charts, a pair of curved scales calibrated to indicate latitudinal degrees, and said scales being fixed upon the opposite sides of the frame, an arcuated chart calibrated to indicate dates and months, said arcuated chart being fixed to the back edge of the frame and extending outwardly from opposite sides and pointers carried by the housing to override the curved scales as the housing is adjusted upon the frame to vary the horizontal angularity of the ring.

2. The structure according to claim 1 wherein the pivot means for the ring permits the ring to be rocked in a horizontal plane, the pivot means for the ring being adjustable along the frame, the frame being arcuately slotted for the traverse engagement of the pivot means and locking means for the pivot means with respect to the frame, a curved rod vertically mounted and slidable upon the ring and adapted to serve as marker for geographic positions in conjunction with the rotation of the globe, the said rod being concentric with the globe and having means for locking the rod to the ring to move with the ring relative to the globe, a ball being apertured for traverse engagement with the ring to serve as marker for geographic positions in conjunction with the rotation of the globe, means carried by the ball for clamping engagement with the ring and whereby the ball is fixedly adjustable upon the ring, the clamping means being apertured and threaded for the threaded engagement of a relatively short straight rod indicating the direction of the sun beams.

3. The structure according to claim 1 wherein a pair of cylindrical concentric co-axial charts being axial with respect to the globe are so mounted below the globe that the upper chart is rotative with the globe and the lower chart independently rotative, the upper chart indicating time zones and longitudes corresponding to the longitudinal lines at the intersection of the equatorial line on the globe and being so mounted in a position adjacent to the lower part of the globe as to permit this part of the globe to extend inside the open end of this co-axial chart without interfering with the movements of the ring encircling the globe and the curved rod mounted on this ring, the lower chart indicating time, longitudinal degrees and mileage being so mounted in a position adjacent to the upper chart as to permit the means locking the two charts together to be placed inside the open end of this co-axial chart without interfering with the movements of these charts relative to the frame, a pointer fixed to the lower terminal portion of the frame and extending over both of the charts whereby to permit correlation of the data printed on the two charts, and being positioned in the vertical plane of the axis of the half circular frame and in close proximity to the globe this pointer permits bringing the ball and the curved rod mounted and slidable on the ring encircling the globe into true alignment with the vertical center line of said charts and thereby permitting conversion of the rotative movements of the globe into time, degrees and mileage.

References Cited by the Examiner

UNITED STATES PATENTS

| Re. 19,682 | 8/35 | Lawton | 35—46 |
| 774,998 | 11/04 | Willson. | |
| 1,183,068 | 5/16 | Johnson | 35—45 |
| 1,808,354 | 6/31 | King | 35—46 |
| 2,697,280 | 12/54 | Parker | 35—47 X |
| 3,110,108 | 11/63 | Sundblad | 35—46 X |

FOREIGN PATENTS

| 3,180 | 2/12 | Great Britain. |
| 4,035 | 2/84 | Great Britain. |
| 339,255 | 4/36 | Italy. |
| 335,110 | 2/59 | Switzerland. |

EUGENE R. CAPOZIO, *Primary Examiner.*

JEROME SCHNALL, *Examiner.*